United States Patent [19]

Klemm

[11] 4,234,880
[45] Nov. 18, 1980

[54] ADAPTIVE METHOD AND A RADAR RECEIVER FOR SUPPRESSION OF DISTURBING PORTIONS OF THE DOPPLER SPECTRUM

[75] Inventor: Richard Klemm, La Spezia, Italy

[73] Assignee: Siemens Aktiengesellschaft, Berlin & Munich, Fed. Rep. of Germany

[21] Appl. No.: 963,359

[22] Filed: Nov. 24, 1978

[30] Foreign Application Priority Data

Nov. 23, 1977 [DE] Fed. Rep. of Germany ....... 2752338

[51] Int. Cl.$^3$ ............................................. G01S 13/02
[52] U.S. Cl. .................................................. 343/5 FT
[58] Field of Search ..................................... 343/5 FT

[56] References Cited

U.S. PATENT DOCUMENTS

| | | | |
|---|---|---|---|
| 3,783,258 | 1/1974 | Chwastyk | 343/5 FT X |
| 3,987,285 | 10/1976 | Perry | 343/5 FT X |
| 4,003,054 | 1/1977 | Goldstone | 343/5 FT X |
| 4,053,885 | 10/1977 | Yomita et al. | 343/5 FT X |
| 4,069,468 | 1/1978 | Bartram | 343/5 FT X |

OTHER PUBLICATIONS

"Adaptive Digital MTI Signal Processing" by V. G. Hansen et al., Eascon 73 Record (1973) IEEE, pp. 170–176.

Primary Examiner—Malcolm F. Hubler
Attorney, Agent, or Firm—Hill, Van Santen, Steadman, Chiara & Simpson

[57] ABSTRACT

Disturbing components of the Doppler frequency spectrum in a radar receiver, having coherent integration, are suppressed. In this technique, the order of interference suppression and coherent integration is changed such that the echo values are first fed to a circuit to effect a Fourier transformation. Then, the disturbing components in the frequency band are deliberately suppressed, and a sub-optimal detection method suitable for real-time operation is derived from the optimum detection model in that sub-matrices symmetrical with the principle diagonal are formed from the power spectrum matrix, through which approximate decorrelation of the disturbing components is achieved.

11 Claims, 7 Drawing Figures

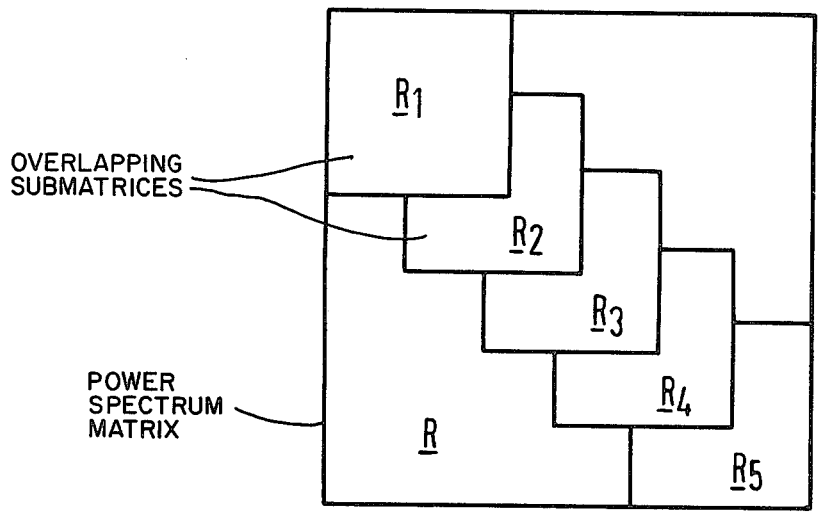
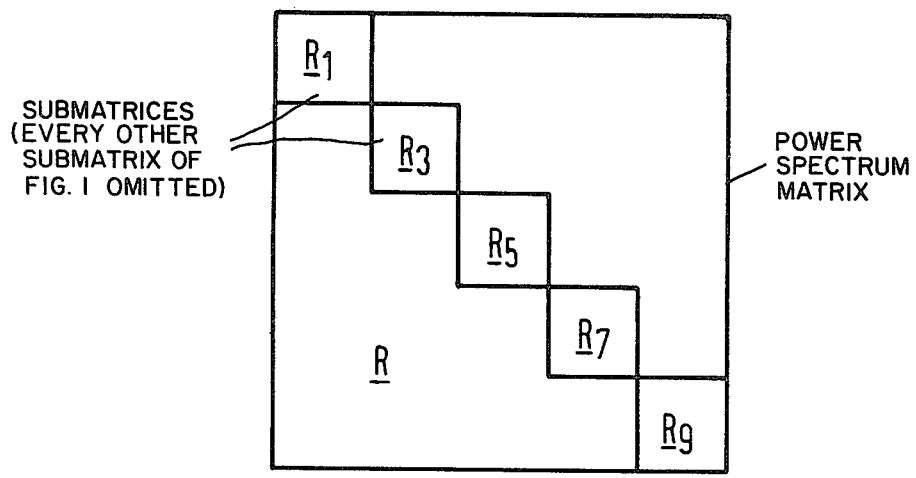

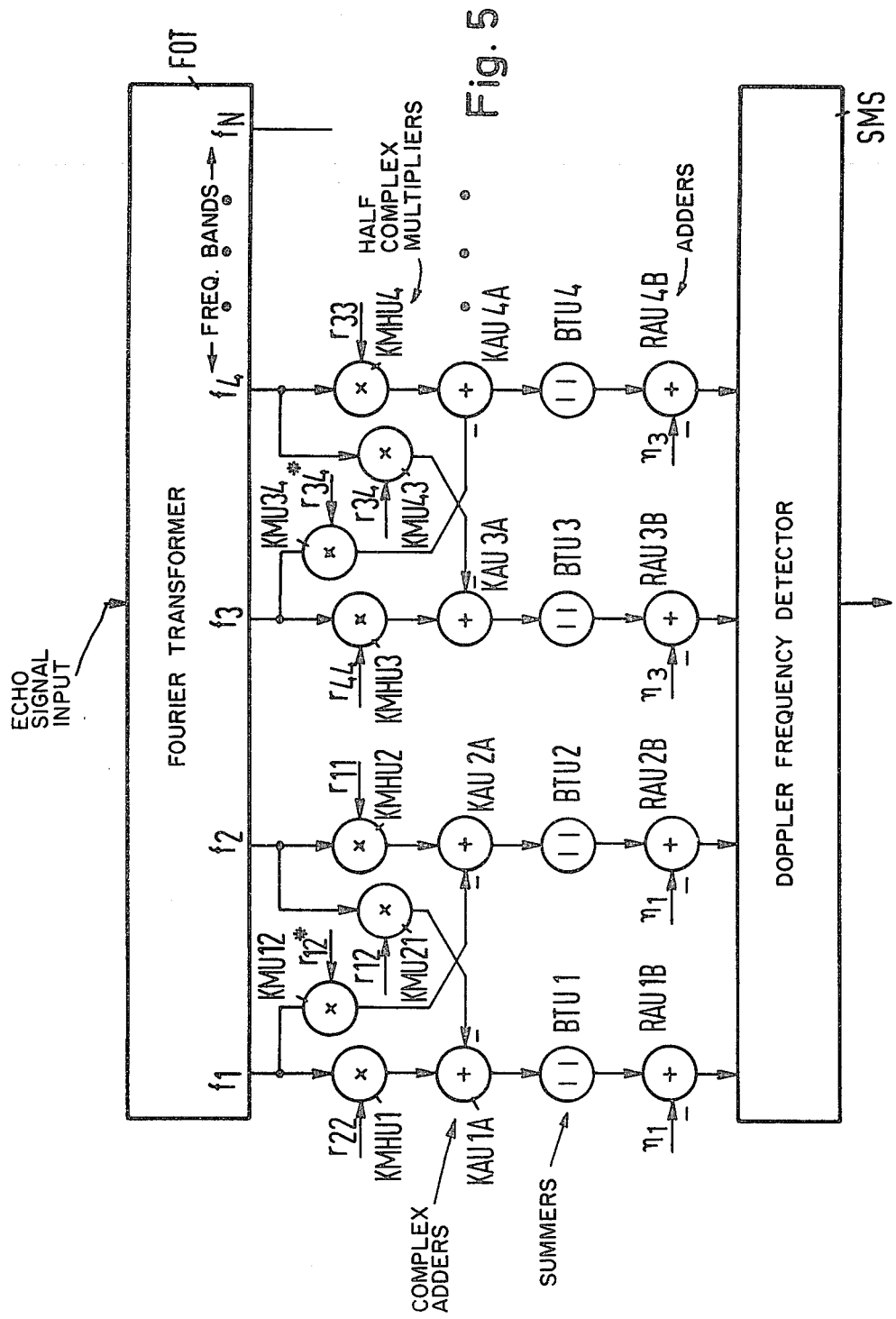

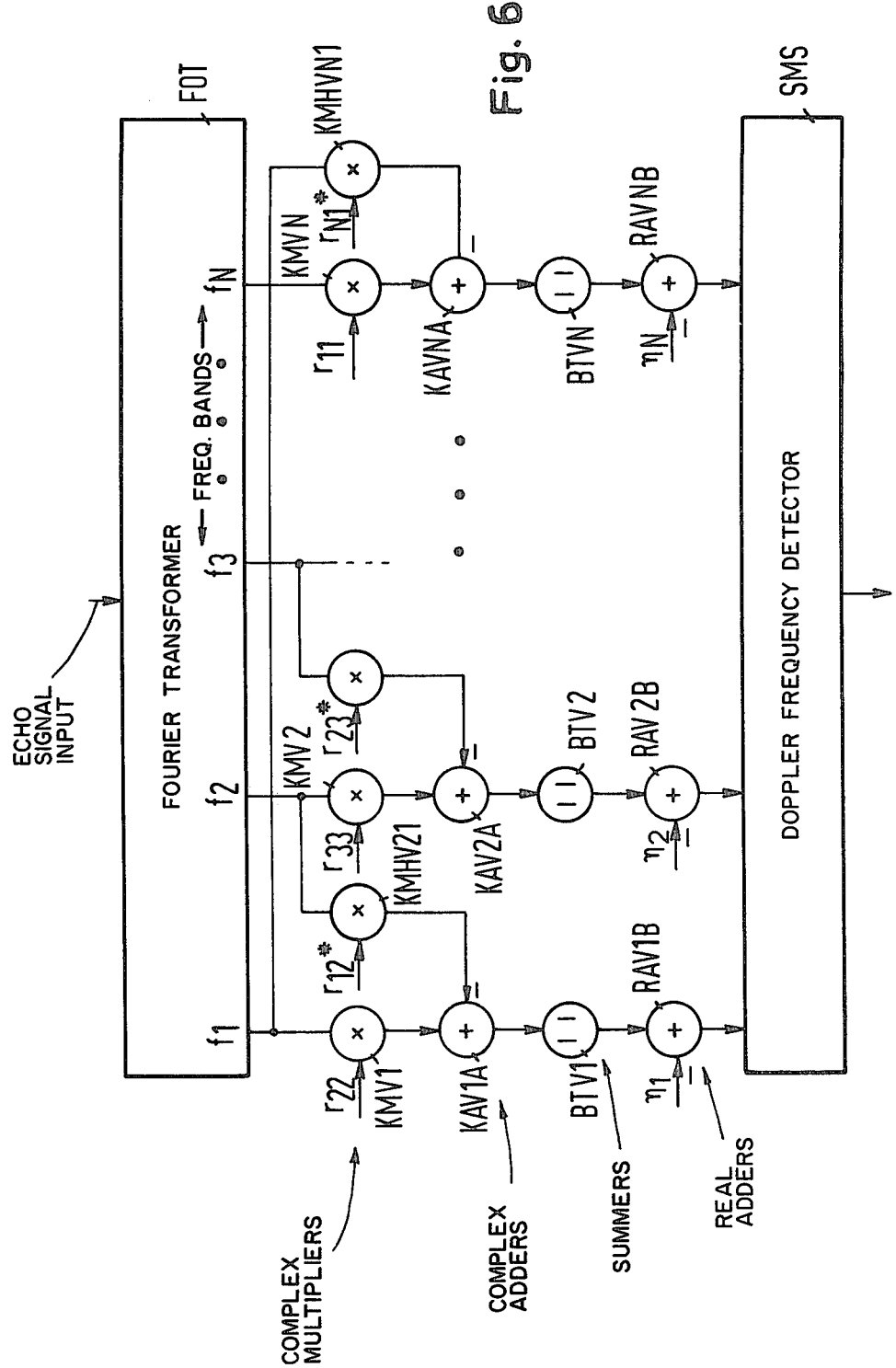

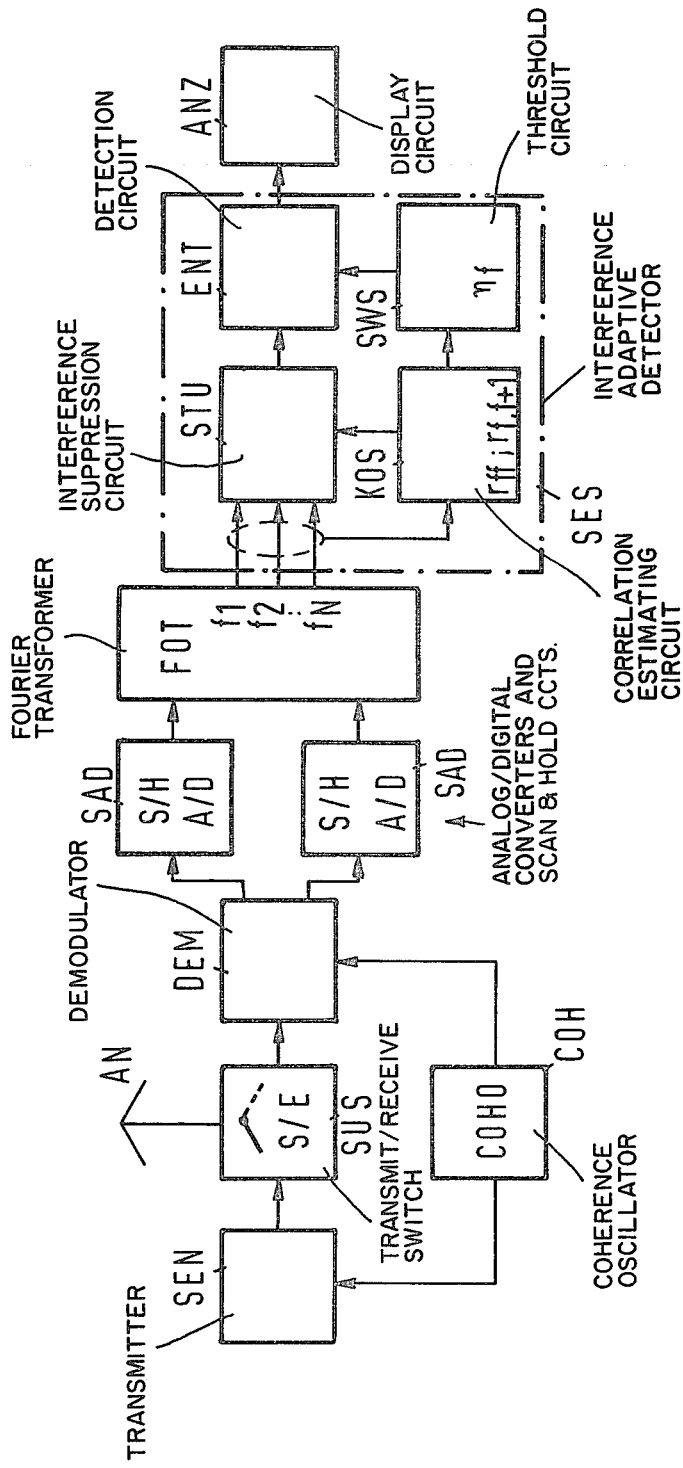

ADAPTIVE METHOD AND A RADAR RECEIVER FOR SUPPRESSION OF DISTURBING PORTIONS OF THE DOPPLER SPECTRUM

BACKGROUND OF THE INVENTION

1. Field of the Invention

The present invention relates to a method of suppressing disturbing portions of the Doppler frequency spectrum in a radar receiver with coherent integration.

2. Description of the Prior Art

The Doppler spectrum of interference resulting from reflection from moving reflectors, in particular interference due to weather or sea conditions ("clutter") is not known and so such interference must be adaptively suppressed in radar apparatus. Filters having a fixed transmission function, like the known circuits for permanent echo suppression (so-called MTI filters) fail for this purpose. At present, two methods for adaptive suppression of disturbing echoes are known. Both methods are applied to the echoes directly, i.e. before any coherent integration. With the so-called "clutter-locking" method, the mean Doppler frequency of the disturbance spectrum is estimated and used to shift the blocking band of a conventional MTI filter. This can be achieved by changing the frequency of the coherence oscillator or by approximate phase-shifting of the echo values. Details of this technique is provided in the "EASCON 73 Record" (1973) IEEE, PP. 170–176.

This method has the disadvantage that in order to suppress disturbing echoes, one is dependent upon transmission function of the permanent echo suppression filter (MTI filter). One shifts the blocking band to the mean frequency of the interference, but cannot adapt any further to the pattern of the interference spectrum, in particular the band width. The method fails completely when the interference is made up of a number of components of varying mean frequency overlaid. The aforementioned method can be applied in radars with continuous scanning. When used in radars having progressive scanning, such types of filtering methods have the disadvantage that the number of echoes is reduced by the number of filter coefficients. This leads to a shortening of the coherent integration that normally follows.

In another method, the azimuthal correlation of a disturbance area is estimated, and from this estimation a transverse filter is established for suppressing the interference.

This filter requires a relatively complicated algorithm and fairly precise computation (about 12 bit) to work out the filter coefficients from the estimated interference correlation.

SUMMARY OF THE INVENTION

The primary object of the present invention is to improve suppression of disturbing parts of the Doppler spectrum.

In accordance with the invention, this object is achieved with a method of the type generally mentioned in the introduction, in that the order of interference suppression and coherent integration is transposed, such that the echo values are first fed to a circuit to effect the Fourier transformation, and the disturbing components in the frequency bands are deliberately suppressed, and in that a sub-optimal detection method suitable for real-time operation is derived from the optimum detection model in that sub-matrices symmetrical with the principal diagonal are formed from the power spectrum matrix, through which approximate decorrelation of the disturbing components is achieved.

In this manner, deliberate suppression of undesired disturbing components of the Doppler spectrum is possible.

The present invention also concerns a radar receiver for implementing the above-mentioned method, which receiver is characterized in that the scanning values are fed to a Fourier transformer, the output channels of which are connected to a circuit to calculate the filter coefficients, the level of the detection thresholds being determined by a following circuit, in that the channel outputs of the Fourier transformer are also connected to a circuit for interference suppression in which the switching elements of the individual transmission channels are actuated by the circuit calculating the filter coefficients and by the circuit determining the detection thresholds.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a graphic illustration showing the formation of spectrum sub-matrices;

FIG. 2 is a graphic illustration showing the selection of $2 \times 2$ sub-matrices;

FIG. 5 is a schematic representation of a first circuit for adaptive interference suppression in the frequency band;

FIG. 6 is a schematic representation of a second circuit for adaptive interference suppression in the frequency band; and FIG. 7 is a block circuit diagram of a radar constructed in accordance with the present invention;

DESCRIPTION OF THE PREFERRED EMBODIMENTS

Figure 3:
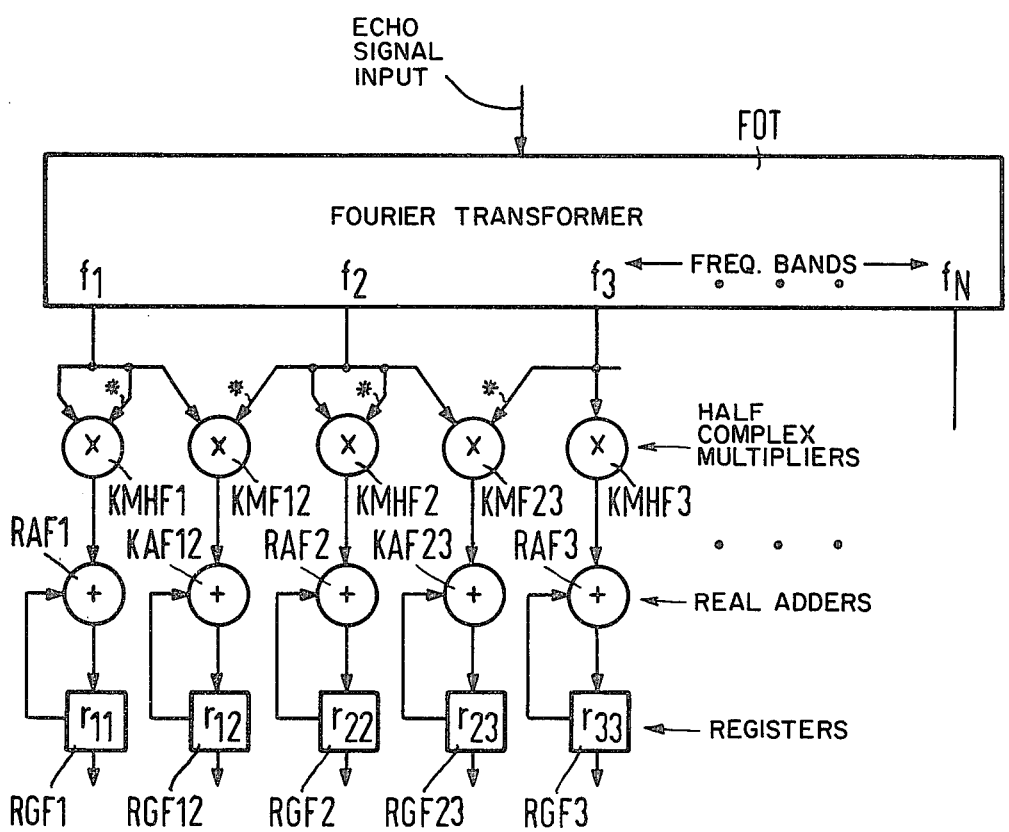
FIG. 3 is a schematic representation of a circuit for calculating the filter coefficients.

One thought which is essential to the invention is changing the order of interference suppression and coherent integration, i.e. first subjecting the echo values to the Fourier transformation (corresponding to a Doppler filter bank), in particular the discrete Fourier transformation DFT, and then suppressing the disturbing components in the frequency band. Since interference echoes are stochastic, a statistical detection process must be applied. From the viewpoint of optimum filter theory it is irrelevant whether the interference suppression is effected in the time or the frequency domain. The optimum linear detection model for a target of unknown Doppler frequency i in interference with Gaussian distribution is:

$$\max_i \left| z^* R^{-1} s_i \right| \begin{array}{l} > \\ \lambda \text{ Distinction} \\ < \end{array} \begin{array}{l} \text{Target present} \\ \\ \text{No target} \end{array} \quad (1)$$

Here z is the vector of the temporal echo values for a specific range element, R is the covariance matrix of the disturbing components contained in z, $s_i$ are the vectors of the expected target signal (Doppler filter bank) and $\lambda$ is the detection threshold. Because of the great number of computing operations, expression (1) often cannot be realized for real-time operation in a straight forward manner. In the frequency band, the quantity z represents the spectrum of the echo values, R the power spectrum matrix of the interference and $s_i$ represents the spectrum of the target signals. The totality of $s_i$ vectors forms the standard matrix in the frequency band. Application of the DFT to the interference values produces approximate diagonalization of the matrix R when the interference echoes are stationary, i.e. most of the information is closely concentrated around the principle diagonal of R. This is particularly the case in radars having progressive, i.e. non-constant, scanning.

The diagonalization effect of the discrete Fourier transformation (DFT) can be exploited advantageously to derive a sub-optimal detection method suitable for real-time operation from the optimum model expressed by expression (1). For this purpose, submatrices $R_f$ which are symmetrical with the main diagonal are formed from the power spectrum matrix R in FIG. 1. Instead of the optimum test set forth in expression (1), the sub-optimal test:

$$\max_f \left| z_f R_f^{-1} s_f \right| \begin{matrix} < \\ > \end{matrix} \lambda \qquad (2)$$

is carried out. When the power of the submatrices $R_f$ is small in relation to the power of R, this means a saving in computing operations. Compared with expression (1) losses in attainable signal-to-noise ratio occur which depend upon the power of $R_f$. In passing from $s_i$ to $s_f$ the reduction power produces no losses as regards the target signal as the coherent integration has been preceded by the DFT and so the target signal is only contained in one element of $s_i$.

Tests have shown that in most cases it is sufficient to give the sub-matrices $R_f$ the power 2. For any forms of interference spectrum arising in a radar having progressive or step scanning, and when a plurality of mean interference frequencies are overlaid, this method yields gains in the signal-to-noise ratio which diverge by no more than 3 dB from the optimum in expression (1). This includes two requirements which must be satisfied for realization:

(a) The target signal lies in the middle of the transmission function of a Doppler channel. This can be more or less achieved when detecting targets of unknown Doppler frequency in that a plurality of proper filters are provided with widely overlapping transmission characteristics. Such arrangements are described, for example, in the publication NTZ (1972), vol. 2, p. 72.

(b) Multiplying the output signal of the two neighboring DFT channels with the inverse 2×2 matrix produces decorrelation of both channels, one always serving as a reference channel for the other, i.e. to measure the interference. The two channels should be orthogonally related so that as far as possible a target signal only appears in one of the two channels. So, if more Doppler filters are provided than needed for the orthogonal DFT raster, one should choose not the immediate neighboring channel, but another channel, preferably the next orthogonal channel, to decorrelate any one channel.

The restriction to 2×2 matrices offers the advantage that the matrix inversion only requires a very small number of computing operations (3 real multiplications for the determinate):

$$R_f = \begin{vmatrix} r_{f,f} & r_{f,f+1} \\ r^*_{f,f+1} & r_{f+1,f+1} \end{vmatrix}$$

it is known that $$r_f^{-1} = \frac{1}{r_{f,f} \cdot r_{f+1,f+1} - r^*_{f,f+1} \sqrt{r_{f,f+1}}} \begin{pmatrix} r_{f+1,f+1} & -r_{f,f+1} \\ -r^*_{f,f+1} & r_{f,f} \end{pmatrix} \qquad (3)$$

The divisions of the matrix elements by the real determinate can be saved by bringing the determinate onto the right-hand side of the expression (2). This is then equivalent to regulating the detection threshold according to f, i.e. the frequency:

$$\eta_f = \lambda(r_{f,f} r_{f+1,f+1} - r_{f,f+1}^* \cdot r_{f,f+1}). \qquad (4)$$

In the totality of all overlapping 2×2 submatrices in FIG. 1, every single Doppler frequency occurs twice. However, it is sufficient to focus on just one of the pair in each case. So that every second submatrix can be omitted. The result is a selective diagram as illustrated in FIG. 2.

According to the present invention, the method produces an approximate decorrelation and, thus, suppression of the interference echoes of unknown spectrum. The echo values are first transformed by the DFT into the frequency band, which leads to the described sub-optimal method which is distinguished by considerable saving in computing operations and is therefore suitable for real-time interference suppression. To free any one Doppler channel of interference, one merely needs to use a neighboring channel to measure the interference. The output signals of both channels are rated with factors and added. The rating factors are derived from the corresponding spectrum submatrix as in expression (3) and need no calculation of any kind. One merely has to work out the inverse determinants of the submatrices $R_f$ and use the same for the Doppler-frequency related detection threshold. For a DFT channel of a frequency f, the values $r_{f,f}$, $r_{f+1,f+1}$ and $r_{f,f+1}$ must be estimated in real-time terms. This can be achieved both by averaging over a plurality of range elements and over a plurality of successive scanning sequences.

An interference-adaptive detection system based on the method described above breaks down into three parts:

(1) calculation of the filter coefficients;
(2) calculation of the detection thresholds $\eta_f$ depending on the Doppler frequency; and
(3) the actual suppression of the interference together with detection.

The simple formation of the spectrum submatrices as in expression (3) results in a standard computing structure which is used in all three tasks. Bearing in mind that high data throughput occurs with radar (typically 1 MHz), the computing structures in FIGS. 3-6 were shown in parallel for all the Doppler frequencies. It is possible, in a manner known per se, to achieve savings by multiplexing with fast computing units.

In the circuit arrangement illustrated in FIG. 3, the echo signals are fed to the Fourier transformer FOT in the form of separate scanning values (preferably digitized). With radars employing progressive ("stepped") scanning it is recommended that so-called fast Fourier transformation (FFT) be used, while with surveillance radars scanning in an essentially constant pattern the recurrent discrete Fourier transformation brings about advantages. Details in this connection are provided in the periodical NTZ, vol. 30, 1977, Page 159. The individual range sectors are separated one from another by a suitable time-division multiplexing. At the output of the Fourier transformer FOT there are the complex instantaneous spectra for the different frequency bands, here referenced $f_1-f_N$, each being staggered temporally in relation to the others for the various range sectors. In all, therefore, the entire interesting Doppler frequency range, essentially the area between the permanent echo spectrum lines, is divided up into N subsections on a frequency basis. These N subsections can also overlap one another with respect to frequency.

The various output signals at the N output channels of the Fourier transformer FOT indicate the extent to which the channel in question is occupied by incoming signals.

The following applies with respect to identification of the individual portions of the circuitry:
  Initial Letters RM=real multipliers;
  Initial Letters KM=complex multipliers;
  Initial Letters KMH=half complex multiplier (two real multiplications to calculate the square of a complex value);
  Initial Letters KA=complex adder; and
  Initial Letters RA=real adder.

One half complex multiplier KMHF1, KMHF2, etc, is allocated to each of the N output channels. These form the product (=instantaneous power spectrum value) from the value $f_f$ in question and the value $f_f^*$ and pass this to following adder stages KAF1, KAF2, etc. Here, and further on, the index denoted by the subscript $f$ stands for one of the N channels while the superscript * indicates that the value is a conjugate complex value. By means of a register RGF1, RGF2, etc, allocated to each channel, the output value from the addition in question is held, the individual values being accumulated constantly by means of return loop to the adder RAF1, RAF2, etc, in question. This means that an average is taken over a plurality of range sectors. Expediently, this averaging is carried out over the entire interference area because, for the most part, interference—in contrast to signals from moving targets—occurs in a very large number of range sectors. One can obtain information concerning the interference area from a clutter chart, for example plotted from false reports after switching on the MT1. Therefore, the register value $r_{11}$ in the register RGF1 represents the characteristic value for the channel $f_1$, while the corresponding value for the channel $f_2$, for example, is $r_{22}$, and so on.

In order to calculate the cross-correlation values, the values from the successive channels (e.g. $f_1$ and $f_2$) are combined, for which purpose suitable complex multipliers KMF12, KMF23, etc are provided. The input signal received by the multiplier which lies between the channels $f_f$ and $F_{f+1}$ comprises, first of all, the value of the output signal of $f_f$ and, secondly, the value of $f_{f+1}^*$. The result so obtained passes to a complex adder KAF12, KAF23, etc, which is followed, in each case, by a register RGF12, RGF23, etc, in which the corresponding values are accumulated continuously via the return loop extending to the adder KAF12, KAF23, etc, in question. The corresponding result (cross-correlation value) averaged over a plurality of range sectors in the disturbed area is identified for the two channels by $r_{12}$ (for $f_1$, $f_2$), $r_{23}$ (for $f_2$, $f_3$) and so on, and is available in the registers RGF12, RGF23, etc, for further processing. Expressed in general terms, the register RGFf contains the real value $r_{f,f}$ and the register RGFf,f+1 contains the complex value $r_{f,f+1}$.

Figure 4:
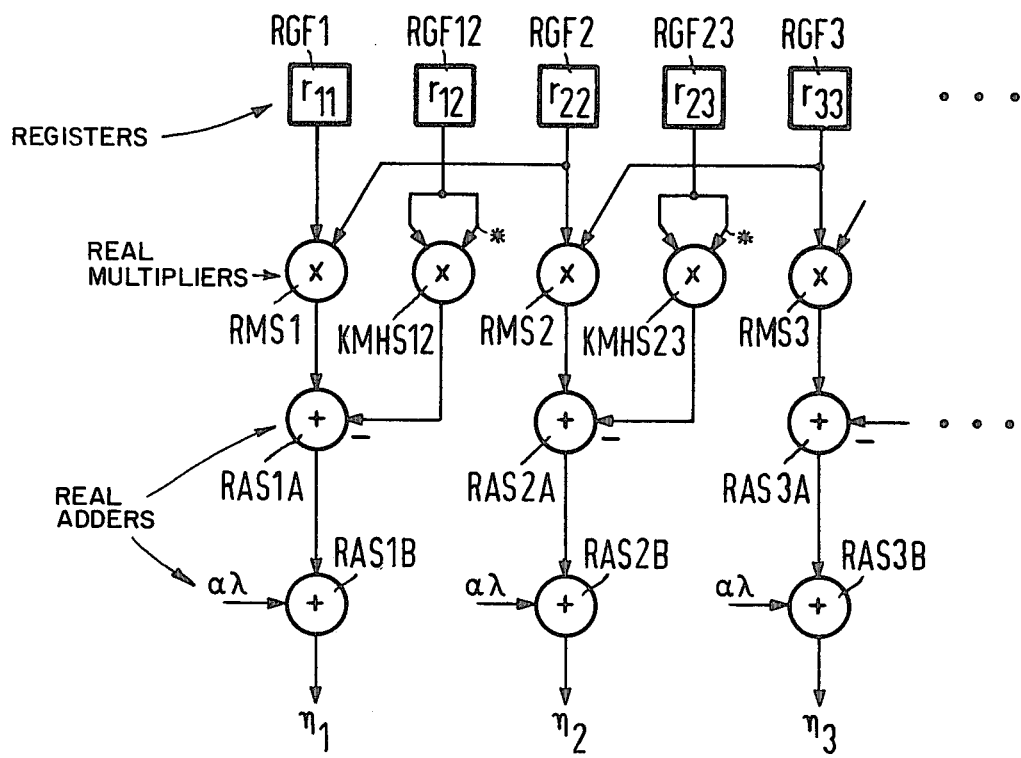
FIG. 4 is a schematic representation of a circuit for determining the detection thresholds.

The detection thresholds $\eta_1$, $\eta_2$, etc are derived from the register values $r_{11}$, $r_{12}$, etc, illustrated in FIG. 3, the associated circuit arrangement being depicted in FIG. 4. In greater detail, the register value of one channel (e.g. $r_{11}$) and the register value of the next channel (e.g. $r_{22}$) are fed to a real multiplier (e.g. RMS1). The outputs of these multipliers RMS1, RMS2, etc, are linked to real adders RAS1, RAS2, etc. From the outputs of the register stages RGF12, RGF23, etc, containing register values $r_{12}$, $r_{23}$, etc, originating from pairs of neighboring channels half complex multipliers KMHS12, KMHS23, etc, are actuated, on the one hand with the actual value, e.g. $r_{12}$, and on the other hand with the conjugate complex value, e.g. $r_{12}^*$. In general terms, the multipliers RMS1, RMS2, etc form the product from $r_{f,f} \cdot r_{f+1,f+1}$ while the multipliers KMHS12, KMHS23, etc, form the product of $r_{f,f+1} \cdot r_{f,f+1}^*$. The outputs of these half complex multipliers KMHS12, KMHS23, etc are linked to the negative input of the respective neighboring adders RAS1A, RAS1B, etc and, together with the values coming from the real multipliers RMS1, RMS2, etc, produce a difference which serves, in each case, as the input value for other real adders RAS1B, RAS2B, etc. The value $\alpha \cdot \lambda$ is fed to the second input of these adders, in each case, and the threshold value $\eta_1$ for channel 1, $\eta_2$ for channel 2, and so on is produced by combination of these two values. Therefore, the values for the detection threshold $\eta_1$ to $\eta_N$ are determined individually for each of the N channels and are available for further processing. The factor $\lambda$ fixes the false alarm level in accordance with expression (4), while $\alpha$ represents a constant factor. In the present example, the product from expression (4) is approximated by repeated adding of fractions $\alpha \cdot \lambda$ of the proportionality factor. The value $\alpha \cdot \lambda$ is the same for all the channels and can be obtained by moving the binary number $\lambda$ to the right.

The structure for adaptive interference suppression in the frequency band is illustrated in greater detail in FIG. 5. In FIG. 5 the inverse $2 \times 2$ spectrum matrices are used with the computing structure employed for estimating correlation and calculating the detection thresholds for filtering as in expression (2). One half complex multiplier KMHU1, KMHU2, etc, followed in each case by a complex adder KAU1A, KAU2A, etc, by a circuit to form the total BTU1, BTU2, etc, and by another real adder RAU1B, RAU2B etc is connected to the output of each of the N channels of the Fourier transformer FOT as in FIG. 3. The second input of the multipliers KMHU1, KMHU2 etc is fed with the register content $r_{11}$, $r_{33}$ etc of the preceding channel in the case of even-numbered channels (KMHU2, KMHU4, etc) and with the register content $r_{22}$, $r_{44}$ of the following channel in the case of odd-numbered channels (KMHU1, KMHU3, etc) from the registers RGF1, RGF2 etc in FIG. 3. The value obtained through this multiplication passes to the complex adders KAU1A, KAU2A, etc the negative input of which is activated in each case by a complex multiplier KMU12, KMU34, etc or KMU21, KMU43, etc. In the case of even-numbered channels (e.g. $f_2$) the associated multipliers (e.g. KMU12) are supplied with input values from the output of the preceding channel (e.g. $f_1$), in the case of odd-numbered channels (e.g. $f_1$) from the output of the following channel (e.g. $f_2$). The multipliers (e.g. KMU12) passed to the even-numbered channel (e.g. $f_2$) are also supplied with the factor r* (e.g. $r_{12}$*), the multipliers (e.g. KMU21) passed to the odd-numbered channel (e.g. $f_1$) with the factor $r_{12}$ (e.g. $r_1$), from the register RG12, RG34, etc common in each case to these two channels in pairs.

In each of the N channels in accordance with expression (3) the values $\eta_1$, $\eta_3$ etc, i.e. the threshold value from FIG. 4, is also fed to the negative input of the real adder RAU1B, RAU2B etc on the output side, using onlu one value, preferably the odd-numbered value, for two neighboring channels in each case, i.e. the value $\eta_1$ and for $f_1$ and $f_2$ in both cases, the value $\eta_3$ for $f_3$ and $f_4$ in both cases, and so on. The signal which is the greatest by virtue of its sum is established with the circuit SMS connected on the output side from the output values of the real adder stages RAU1B, RAU2B etc associated with each channel.

The summation in BT1, BT2 etc and in SMS and can be achieved to advantage approximately by an addition. The target Doppler frequency, i.e. the frequency caused by a genuine target such as an aircraft for example, is determined by means of the circuit SMS. If such a determination of the target Doppler frequency is of no interest, it may be replaced by a disjunctive combining operation which is also effected by a subtraction. It is therefore conceivable that the operations effected by the complex adders RAF1, RAS1A, RAU1A, RAU1B etc and by the summation circuits BTU1, BTU2 etc and by the circuit SMS could be completed by a single series of adders. As digital adders are very inexpensive, one must make the decision whether the savings justifies the extra control expenditure incurred by multiplexing.

With approximately the same structure one can also realize a modified filtering method which produces the same effect as the circuit illustrated in FIG. 5. Details of such a construction are illustrated in FIG. 6. Each channel is provided with a multiplier KMV1, KMV2 etc, an adder KAV1A, KAV2A etc, a summation circuit BTV1, BTV2 etc and a further adder RAV1B, RAV2B etc. At the second input the multipliers KMV1, KMV2 etc. receive the register value $r_{22}$, $r_{33}$ etc of the registers RGF2, RGF3 etc of the following channel. The value $r_{11}$ of the first channel is used for the last channel N. In contrast to the circuit illustrated in FIG. 5, however, here two channels are not linked in pairs for mutual decorrelation, but a single channel in each case is decorrelated by its righthand (or vice-versa if necessary by its left-hand) neighboring channel. To this end, the output signal of the following channel (e.g. $f_2$) is fed to a half commplex multipler (e.g. KMHV21) the second input of which is fed with the register value $r_{f,f+1}$* (e.g. $r_{12}$*) from the intermediate register (e.g. RGF12). The product obtained in this manner is fed to the negative input of the neighboring adder, e.g. KAV1A. One disadvantage of this technique, as compared with the technique of FIG. 5, is that all of the threshold values $\eta_1$, $\eta_2$ and so on must be calculated and fed to the adders RAV1B, RAV2B etc. The same is true for the cross-correlation values $r_{12}$, $r_{23}$, $r_{34}$ etc only half of which are needed with the structure of FIG. 5.

The invention constitutes a particularly advantageous solution of adaptive suppression of interference echoes in radars, particularly radars operating with progressive or stepped scanning. The method works equally well for any forms of interference Doppler spectrum, in particular when a plurality of interference factors of different mean frequency are overlaid as well. With this sub-optimal method, the losses in signal-to-noise ratio are no greater than 3 dB compared with the gain attainable in optimum conditions. Favorable values of this order are not attained with other methods heretofore known. Because of its very simple computing structure, the method is especially suitable for real-time signal processing. The simple structure also leads to another advantage, because as a result the interference suppression is not affected by the interference covariance matrix being ill-conditioned, as can be the case with highly correlated interference. Consequently, the method only makes minimal demands on computing precision.

Referring to FIG. 7, a block circuit diagram of a radar receiver constructed in accordance with the present invention is illustrated. In FIG. 7 it can be seen that the antenna AN, the transmitter SEN, the coherence oscillator COH, and the demodulator DEM for the complex demodulation. The two outputs I and Q of the demodulator are connected to the Fourier transformer FOT by means of scanning and holding circuits each followed by analog/digital converters which are commonly referenced SAD. The interference adaptive detection system in accordance with the present invention is enclosed by broken lines and comprises the interference suppression circuit STU, the detection circuit ENT, the correlation estimation circuit KOS (for $r_{f,f}$, $r_{f,f+1}$) and the threshold circuit SWS (for $\eta_f$). The circuit for estimating correlation KOS is actuated directly from the output of the Fourier transformer FOT and is connected on the output side to both the interference suppression circuit STU and the threshold circuit SWS. The threshold circuit directly controls the detection circuit.

Further processing takes place, for example, in a display circuit ANZ or in other evaluation circuits (e.g. computers).

The method of suppression in accordance with the present invention also suppresses ground clutter interference. However, if one MTI filter is connected in each of the I and Q channels in front of the Fourier transformer (FOT) (in FIG. 7 between the analog/digital converters SAD and the Fourier transformer FOT), this reduces the dynamic range of the echo signal. This leads to savings in computing precision in the Fourier transformer FOT and in the following detection system.

Although I have described my invention by reference to particular illustrative embodiments thereof, many changes and modifications of the invention may become apparent to those skilled in the art without departing from the spirit and scope of the invention. I therefore intend to include within the patent warrented hereon all such changes and modifications as may reasonably and properly be included within the scope of my contribution to the art.

I claim:

1. A method for adaptive suppression of disturbing components of the Doppler frequency spectrum in a radar receiver having coherent integration, comprising the steps of:

receiving modulated echo signals in a plurality of frequency bands;

demodulating the echo signals in each frequency band and converting the same to digital signals;

performing a Fourier transformation on the digital echo values;

then comparing the echo value of a band with the echo value of at least one other band to measure the disturbing components and suppressing the disturbing components in the frequency band; and then performing an approximate decorrelation by forming submatrices symmetrical with the principal diagonal from the power spectrum matrix in a suboptimal detection technique suitable for real-time operation, and detecting a Doppler frequency from a decorrelation value which is above a predetermined threshold.

2. The method of claim 1, comprising the step of:

selecting the power of the submatrices to be small in relation to the order of the power spectrum matrix.

3. The method of claim 2, wherein the order of the submatrices is selected to be 2.

4. The method of claim 1, comprising the step of;

combining the output signals of the individual channels of the Fourier transformation to provide a target signal in only a first channel and a second channel is provided, as a reference channel, to measure the interference signal and for decorrelation.

5. The method of claim 4, wherein the step of decorrelation is further defined by the steps of:

filtering the channels with a plurality of Doppler filters having overlapping transmission bands and decorrelating the output of each channel with the output of the next non-overlapping channel.

6. The method of claim 4, wherein the step of decorrelation is further defined by the steps of:

filtering the channels with a plurality of Doppler filters having non-overlapping transmission bands and decorrelating the output of each channel with the output of an adjacent channel.

7. A radar receiver for suppressing disturbing components in the Doppler frequency spectrum, comprising:

a Fourier transformer for receiving scanning values and including a plurality of channel outputs;

filter coefficient means including a plurality of inputs and a plurality of outputs, said inputs connected to said channel outputs, for calculating a plurality of filter coefficients;

level detection threshold means, including a plurality of inputs and a plurality of outputs, said inputs connected to said outputs of said filter coefficient means, for calculating a plurality levels of detection thresholds; and an interference suppression circuit including a plurality of switching means, each of said switching means comprising a first input connected to a respective channel output, a second input connected to and controlled by a respective output of said filter coefficient means and a third input connected to and controlled by a respective output of said detection threshold means, and operable to suppress interference in the respective channels in response to the respective filter coefficients and detection thresholds.

8. The radar receiver of claim 7, comprising:

instantaneous power spectrum means connected to said channel outputs and operable to form the instantaneous power spectrum value from each output channel and in each case two adjacent channels and to average these instantaneous power spectrum values to provide in each case a plurality of range channel values including a plurality of registers for storing the range channel values as the filter coefficients.

9. The rader receiver of claim 8, comprising:

means for averaging the power spectrum values only in the interference area.

10. The radar receiver of claim 8, comprising:

means cross-connecting the filter coefficients of successive pairs of channels, and wherein each of said switching means includes a fourth input for receiving the cross-connected filter coefficients, and a respective output; and a minimum seeking circuit connected to said outputs of said switching means and operable to identify the channel occupied by target echo signals.

11. The radar receiver of claim 8, comprising:

means cross-connecting the filter coefficients of neighboring channels, and wherein each of said switching means including a fourth input for receiving the cross-connected filter coefficients, and a respective output; and a minimum seeking circuit connected to said outputs of said switching means and operable to identify the channel occupied by target echo signals.

* * * * *